Feb. 4, 1964  M. BERLIN ETAL  3,120,601
RULE DIE SET AND APPARATUS FOR MAKING SAME
Filed July 8, 1960  3 Sheets-Sheet 1

INVENTORS
MILTON BERLIN
BY LAWRENCE M. RHEINGOLD
ATTORNEYS

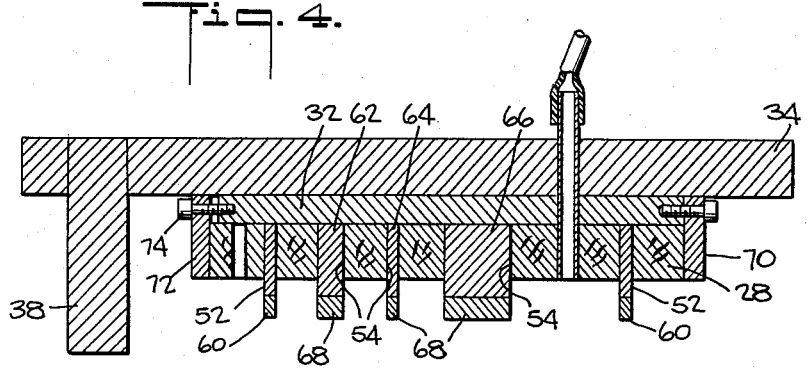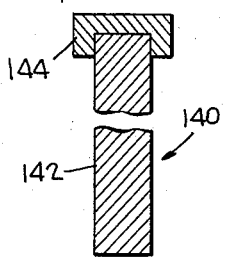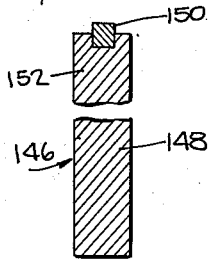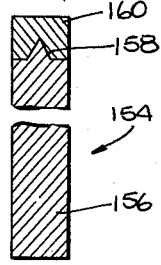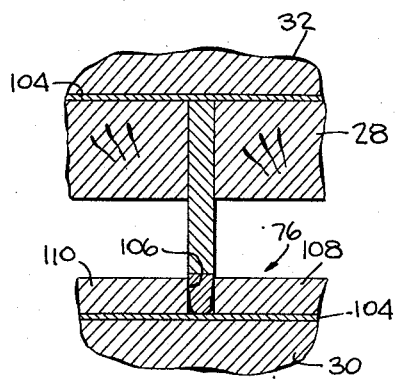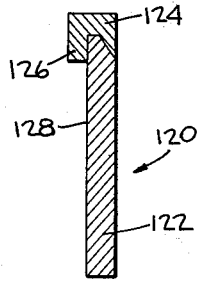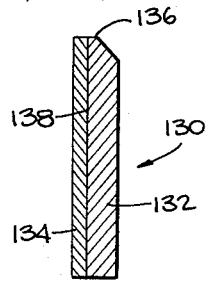

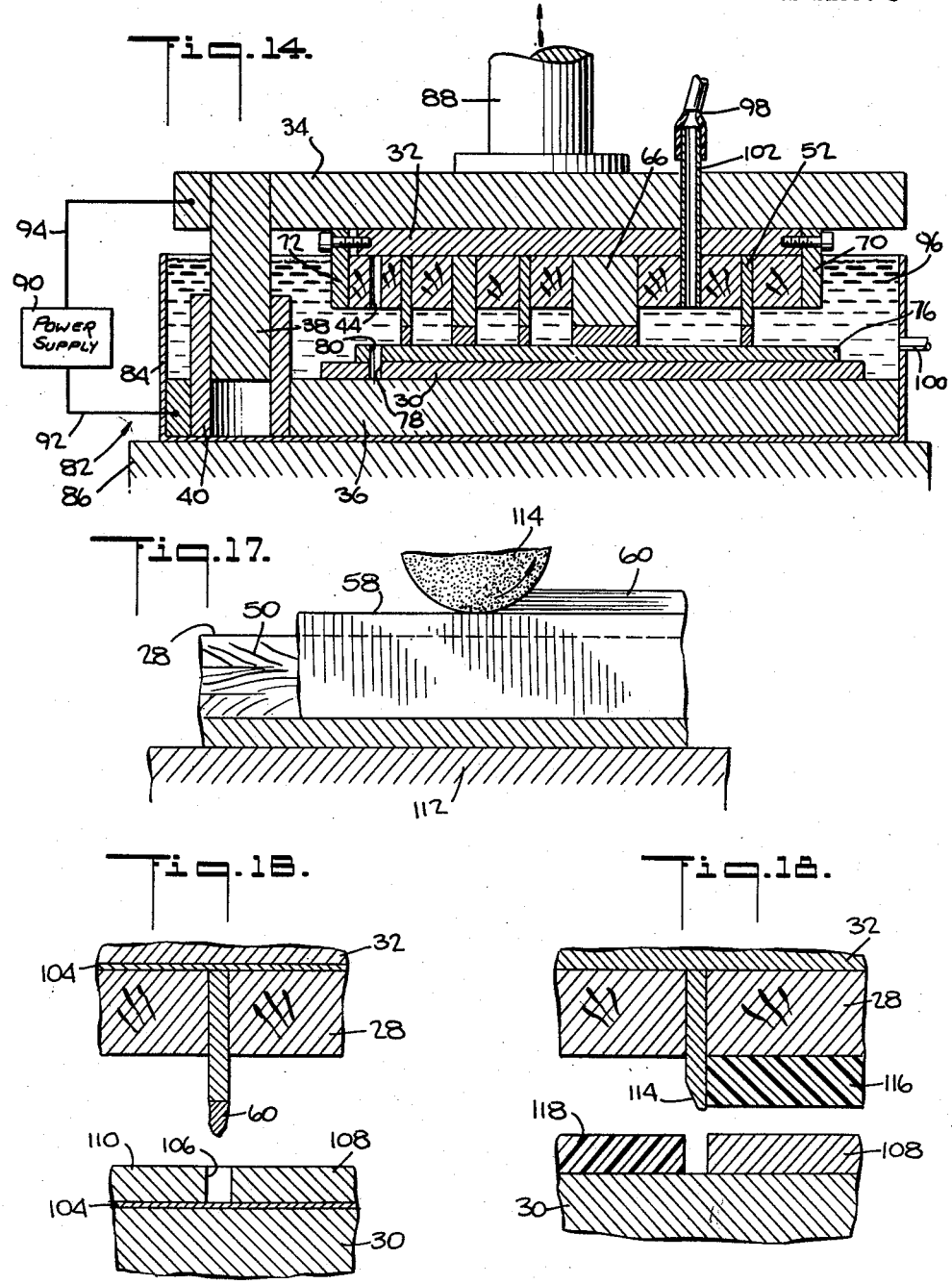

United States Patent Office 3,120,601
Patented Feb. 4, 1964

3,120,601
RULE DIE SET AND APPARATUS FOR
MAKING SAME
Milton Berlin, Forest Hills, and Lawrence M. Rheingold, Baldwin, N.Y., assignors to Templet Industries, Inc., Brooklyn, N.Y., a corporation of New York
Filed July 8, 1960, Ser. No. 41,617
11 Claims. (Cl. 219—69)

This invention relates to a rule die set and to a method of making the same. More particularly the invention pertains to a rule die set for operating upon sheet metal, as for blanking, piercing, drawing, coining or forming the same. It is to be understood that the term "sheet metal" as used herein embraces a wide range of thicknesses, from a few thousandths of an inch to one-quarter of an inch or more.

A conventional present-day rule die set includes a rule die and a punch. The rule die comprises a female die formed from rule stock, usually steel rule stock, which is supported in an inexpensive easily shaped base, e.g. plywood. The punch is a shaped piece of steel die stock constituting a male die that is adapted to be telescopically received in the female die. The female die usually is made by cutting a plug from a plywood block and replacing it, with the rule die stock caught in the kerf. The male die usually is made by cutting die stock, i.e. a metal block, to match the female die. Either die is made first and then is used as a template to lay out the other; however the final shaping of the male die, taking clearances into account, often is disproportionately time-consuming and expensive, bearing in mind that the principal advantages of steel rule die sets are low cost and short time of manufacture. It is observed in passing that where both dies are made simultaneously, it still is necessary to spend the same extra time for the final shaping of the male punch.

It is an object of this invention to provide an improved process and rule die set which have the desired final accuracy but which can be practiced and made in a less costly fashion with less use of skilled help.

It is another object of our invention to provide a process for making a rule die set pursuant to which the male die, i.e. punch, is formed in a manner that requires less labor and expense than heretofore.

It is another object of our invention to provide a process for making a rule die set wherein the male die is fabricated by electro-erosion with the aid of a female rule die electrode which subsequently, by a simple modification, is then used as the female rule die of the die set.

Other objects of our invention in part will be obvious and in part will be pointed out hereinafter.

Our invention accordingly consists in the features of construction, combinations of elements, arrangements of parts and series of steps which will be exemplified in the rule die set, rule stock and method hereinafter described and of which the scope of application will be indicated in the appended claims.

In the accompanying drawings in which is shown one of the various possible embodiments of the invention, FIG. 1 is a plan view of a flat sheet metal component adapted to be stamped out of sheet metal by a rule die set embodying the present invention;

FIG. 4 is an enlarged sectional view taken substantially along the line 4—4 of FIG. 3;

FIGS. 7, 8, 9 and 10 are views similar to FIG. 6 of the rule die stock embodying modified forms of the invention;

FIGS. 11, 12 and 13 are views similar to FIG. 6 of punches embodying modified forms of the invention;

FIG. 14 is a vertical sectional view showing the female rule die in the process of forming its mating punch by electro-erosion;

FIG. 15 is a fragmentary sectional view showing the female rule die after completion of a punch forming operation and while the die still is in engagement with the newly made punch;

FIG. 16 is a view similar to FIG. 15, but illustrating the female rule die after disengagement from the punch;

FIG. 17 is a fragmentary sectional view showing removal of the electrode section of the composite electrode rule die stock; and FIG. 18 is a fragmentary sectional view of the finished die set.

Figure 1:
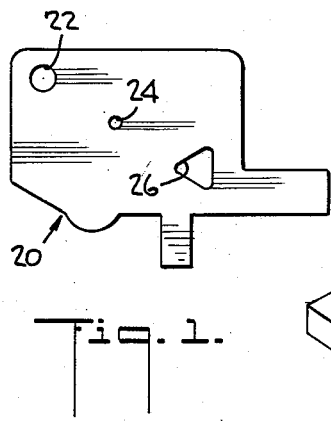
Figure 2:
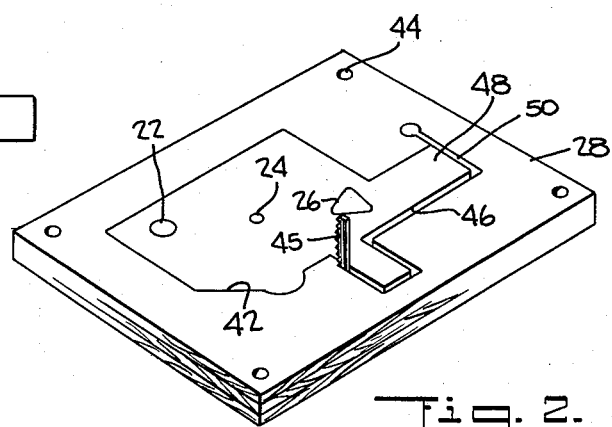
FIG. 2 is a perspective view of the base block of a female rule die during an early step in fabrication of said die.

The first stage in the operation of the present method is to make a female rule die in any conventional manner, except for the unique constitution of the rule die stock and punch stock which will be explained later. The particular method employed in part will be determined by plant policy and in part by the expected length of run of the die set. For example, the rule die stock may be mounted in a base block of wood, plywood, resin or non-metallic laminates which is cut out to receive the rule stock, or the rule die stock may be supported by a base block which is cast in situ around a shape formed of rule stock. If desired, peripheral compression means may be utilized to inhibit buckling of the portion of the rule stock located within the supporting base block. By way of illustration a particular sequence of steps for making the female die will be detailed hereinafter but from the foregoing it will be clear that the invention is not to be limited thereby.

The female rule die thus fabricated is characteristically different from a conventional female rule die only in the rule die stock and punch stock, if any, that is employed. Ordinary rule die stock and punch stock is made of a sturdy metal, usually steel, which will withstand the abuse of metal blanking, piercing, drawing, coining or forming; it is of uniform, i.e. homogeneous constitution, being made of a single metal or alloy. The electrical conductivity of any particular part of the stock is of no importance. However the rule die stock and punch stock used with the instant invention is of a composite nature. More particularly, it includes a first section which is made of sturdy metal, such as steel, which is suitable for metal blanking, piercing, drawing, forming etc. However the working edge of said stock has formed integral therewith and as a uniform extension thereof, as by bonding thereto, a second section which is expendable and subsequently will be removed and which so long as it is present enables said rule die to be used as an electrode. This second section constitutes an extension of the same thickness as or a different thickness from first section. Thus if the first section is, for instance a straight die rule of given thickness, the second section likewise is straight and of the same thickness if a blanking operation is to be performed or of greater thickness for forming. If the first section is a circular rod, the second section is an extension of the rod of the same diameter for piercing, greater for drawing and lesser for coining. Preferably the second section has better electrical conductivity than the first and is of a metal that functions well as an eroding electrode in an electro-eroding process. The second section need not be of a metal that is capable of such metal working operations as blanking, forming and piercing.

The female rule die has its die rules and punches protruding from the supporting base block in such manner that all of the aforesaid second section is free of the base block and enough of the first section is protruding to act as a metal working part upon removal of the second section.

The female rule die may be, and preferably is, heat treated while the second section aforesaid constitutes an integral part of the composite stock. However, the invention may be practiced satisfactorily if no heat treatment is effected until or during removal of the second section.

The second stage in the operation of our method is to use the female rule die with its two sections as an electro-eroding electrode to cut out (by eroding) a punch from die stock of suitable thickness. This type of cutting is well known as an individual step, although not for making punches for rule die sets, and no claim to novelty is made to the cutting step as such.

The third stage in the operation of our present method is to remove the second section of the die rule stock and punch stock, if any.

Thereafter the female rule die is heat treated if such operation has not previously been performed, and the male and female dies are assembled into a die set.

Referring now in detail to the drawings, the reference numeral 20 denotes a flat sheet metal component which is to be blanked from sheet metal, the same being of predetermined contour and having by way of example a large circular opening 22, a small circular opening 24 and a wedge-shaped opening 26.

First we provide a base block 28 for a female die and a base block 30 (see FIG. 14) for a punch. In the particular process being described by way of illustration for making the female rule die, the female base block 28 is diemakers' plywood, a particularly dimensionally stable laminated plywood. The male base block usually is made of die steel. The female base block is mounted on a steel backing plate 32 that is secured to a steel upper shoe 34. The male base block 30 is secured to a steel lower shoe 36. The upper shoe has a pair of diagonally located pilot posts 38 that are slidable in a pair of registered pilot bushings 40 on the lower shoe for the purpose of alignment.

The outline 42 of the component 20, including the openings 22, 24, 26, is marked on a surface of the female base block 28 by conventional lay-out techniques, e.g. by scribing from said component, or with the aid of a template, or by measurements. Additionally two or more registration openings 44 are bored through the base block. A diemakers' jigsaw 45 then is employed to cut through the base block along the outside of the outline 42, thereby forming an opening 46 and a plug 48 which if located in the opening will be separated from the edges thereof by a kerf 50. The kerf is slightly thinner than the composite rule die stock 52 to be used. Holes 54 are formed in the plug 48 (or in the base block before the plug is cut out) to match the openings 22, 24, 26 that are to be pierced.

The rule die stock 52 initially is flat and includes a first section 56 which is of conventional composition for blanking and forming, e.g. hardenable thin steel rule, conventional thickness and conventional width, these latter being determined by the type and thickness of sheet metal to be blanked or formed. The longitudinal edge 58 of the first section which will operatively contact the sheet metal to be blanked or formed is called the "working edge." The rule die stock 52 also includes a second, or tip, section 60 which is integrally joined to the first section along, i.e., at the working edge. The second section constitutes a uniform coplanar and coextensive continuation of the first section. The thicknesses of the two sections are substantially identical if blanking is to be performed; but the width, i.e. height, of the second section will depend upon the nature of the electro-erosion operation, e.g. height of punch to be eroded, and the metallurgical composition of the second section. The second section is made of a material having good electro-erosion properties, e.g. a metal such as brass, copper, aluminum or silver. Brass is preferred because of its low cost, low rate of decomposition during electro-erosion and good electrical conductivity.

The two sections are bonded together along the working edge of the first section by any manner or means that will provide a firm joint, although one that need not withstand rough handling, lateral pressure, or buckling or appreciable compressive stresses. Typical satisfactory joints are those formed by welding, brazing, hard soldering, e.g. silver soldering, soft soldering, e.g. lead soldering, or even cementing, e.g. with epoxy or rubber adhesives.

Figure 6:
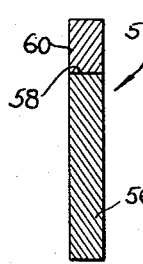
FIG. 6 is an enlarged sectional view taken substantially along the line 6—6 of FIG. 5.
Figure 7:
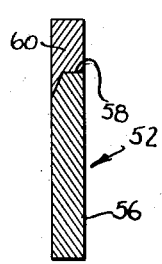
Figure 8:
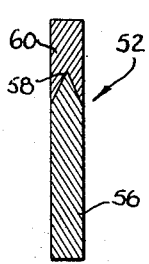

The working edge of the first section may be flat, i.e. square, as shown in FIG. 6 or, if desired, said working edge may be any other suitable shape, e.g. the single-bevel edge of FIG. 7 or the double-bevelled edge of FIG. 8. These latter shapes are useful for certain different sheet metal working operations and have been mentioned merely to point out that the invention is not limited to a composite rule die stock 52 having any specific shape of working edge.

Optionally, to minimize power loss and avoid unnecessary generation of heat, one or both broad surfaces of the composite electrode rule die stock 52, including both the metal working section 56 and the electro-erosion section 60, may be clad, plated, or coated with electrically conductive material, e.g. copper-plated.

Said composite electrode rule die stock is shaped with conventional tools to match the shape of the opening 46 in the female base block 28 and is inserted into the same with the working edge of the first section, and, therefore, all of the second section, protruding from the base block 28. The amount of protrusion of the working edge will be determined by accepted female rule die practice, being a function of the kind and thickness of the sheet metal to be worked and of other ancillary factors, e.g. hardness of the sheet metal, tolerances and number of pieces to be blanked. In making the usual computations for determining the dimensions and quality of the rule die stocks, the width, i.e. height, of the second section is disregarded.

Figure 3:
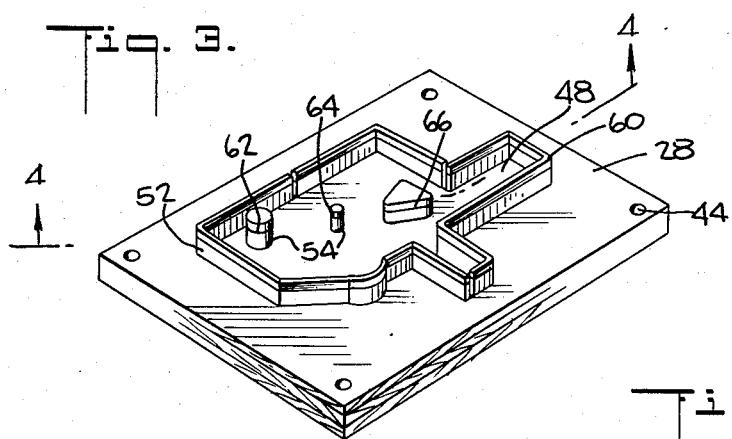
FIG. 3 is a perspective view of the female rule die as it appears in its electrode-usable state, the compression and piloting means being omitted for the sake of clarity.
Figure 5:
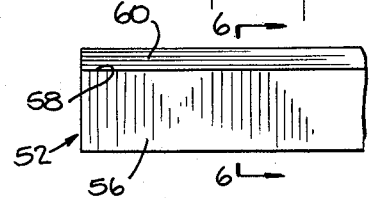
FIG. 5 is an elevational face view of the composite electrode rule die stock used in practicing the instant invention.

Next the plug 48 is inserted in the opening 46 where it will tightly bind the shaped rule die stock in place, firmly holding it to the female base block. The die rule thus will provide a hollow thin metal form projecting from the female base block and tipped by an electro-eroding section. If compression is to be employed the rule die will consist of plural rule die pieces in end-to-end or adjacent relationship as shown in FIG. 3 with small gaps between the ends of successive pieces to allow compression to take place.

It will be apparent that if the sides of the component to be made are straight the rule die stock need not be bent. If the rule die stock is to be bent or otherwise shaped it is worked in soft, i.e. annealed, state and subsequently hardened and drawn (tempered). Straight rule die stock may be cut and used in a hardened state.

For long runs, or accurate working, or when the sheet metal to be worked upon is hard or tough, the female rule die may have its base block 28 peripherally compressed, as shown and described in our U.S. Letters Patent No. 2,850,096, in order to rigidify said block and inhibit buckling of the portion of the rule die pieces supported in the block. The gaps between adjacent end pieces of the rule die stock permit such compression. The shape of the hollow contour defined by the rule die pieces after compression is checked for accuracy against the shape of the component to be formed and, if necessary, corrections are made to the female base block and shaped rule die stock to secure the proper final contour. If the pieces of rule die stock are not hardened, we prefer to harden them at this point and then make such further corrections as the hardening and tempering operations may require. It will be observed that if hardening is performed at this point it is necessary to use a bond, e.g. welding, brazing, or silver soldering, that will not be destroyed at hardening temperatures, e.g. 1600° F. However it is within the scope of our invention to harden at a subsequent time after the punch has been made in the manner hereinafter to be detailed.

It may be noted that the female rule die now would be ready for operation as an ordinary conventional blanking female steel rule die and has the exact construction of such a die, save for the electrode tipping provided by the second section of the rule die stock.

Moreover the female die includes inset punch members 62, 64, 66 which are tightly secured in the openings 54. The inset punches conventionally can be held in place by screws (not shown) in the steel backing plate 32 or by the pressure engendered by the peripheral compression means. Said inset punch members are standard, being made for instance of tool steel, except that, like the steel rule die stock, they too are tipped, i.e. have bonded to their working faces, as by welding, brazing, hard soldering, soft soldering or cementing, a second electrode section 68 of the same material as the second section 60 of the composite rule die stock. The height of the second electrode punch sections 68 is the same as the height of the second electrode die rule sections 60. Since the inset punch members illustrated are to be used for piercing, i.e. blanking out, the openings 22, 24, 26, the second sections thereof have the same cross-sectional shape and dimensions as those of the first section.

The peripheral compressions means referred to above which rigidifies the female base block 28 and rule die pieces and holds in place the sundry inset punches comprises two heavy metal plates 70 (of which only one is illustrated) fast to two perpendicularly meeting side edges of the steel backing plate 32 and protruding therefrom to be abutted by the associated edges of the female base block 28, and two further heavy metal plates 72 (of which only one is illustrated) adjustably connected to the remaining two side edges of the rectangular backing plate and abutted against the remaining two edges of the rectangular female base block. The plates 72 are adjustably forced against the female base block by screws 74 to provide the desired controlled compression.

The male punch is made from a plate 76 of die stock secured, as by screws (not shown), to the male base block 30 that is fastened to the lower shoe 36 of the die set. At any suitable stage during the making of the female rule die after the base blocks 28, 30 are in fixed position on the upper and lower die shoes, the two base blocks are provided with suitable aligning means. The aligning means on the female base blocks 28 comprises the registration openings 44 which may have been formed when the punch receiving holes 54 were drilled. The aligning means on the male base block 30 comprises registration openings 78 therein in exact alignment with the openings 44. The openings 78 may be formed, for example, while the female base block is under peripheral compression and are used to insure alignment when the two halves of the die set are separated during a stage of manufacture subsequent to forming of the punch. The openings 78 may be located by inserting center pointed pins in the openings 44 and closing the die set so that the center points of the pins will leave marks on the male base block 30, or on the punch plate stock 76 if the latter is in the path of the center pointed pins initially. In the latter event the punch plate stock also will have registration openings 80 formed therein.

The next step in the operation of our invention is to form the male punch by electro-erosion, using the female rule die with its special composite rule die stock as the electro-erosion electrode. The electro-erosion step conveniently is practiced with the aid of an Elox electric discharge machine, e.g. the Elox M–500 machine sold by the Elox Corporation of Michigan, located at Clawson, Michigan. This is a machine which mounts a work piece on a stationary support and a forming electro-erosion electrode on a member, e.g. a chuck or quill, mounted for movement toward and away from the stationary support. The machine includes a tank in which the work piece and support are mounted and means is provided to flow a liquid dielectric medium, e.g. oil, into the zone (the gap between the electrode and the work piece) where electro-erosion is taking place, the liquid accumulating in the tank and being pumped back to the erosion zone. The machine further includes a power supply that provides a pulsating D.C. output and leads connect the positive output terminal of the supply to the work piece and the negative output terminal to the electrode. Pulsations take place in a range of from about 20,000 to millions of times a second and a suitable voltage is about 50 volts. Amperage will vary widely depending upon the size of the electrode and speed of electro-erosion. The use of this machine is well known so that no further general details need be supplied.

Referring to FIG. 14, the reference numeral 82 denotes an electro-erosion machine such as described above including a tank 84 on a stationary support 86. A quill 88 is mounted for reciprocation toward and away from the support and power means (not shown) is included to effect such movement of the quill. A power supply 90 provides the requisite pulsating voltage through a positive lead 92 and a negative lead 94. Oil 96 is fed into the tank through a conduit 98 and is withdrawn via a pipe 100.

The die set is mounted on the machine 82 with the upper die shoe fast on the quill 88 and the lower die shoe at the bottom of the tank. The conduit 98 is coupled to a tube 102 extending through the upper die shoe, the female backing plate and the female base plate, and terminating within the hollow shape defined by the composite rule die. The quill is adjusted so that the lower edge of the electrode tips on the die rule pieces and punches are clear of the punch plate 76 on the male base plate. Then power is applied from the source 90 with the lead 94 connected to the upper shoe and the lead 92 to the lower shoe.

To minimize heating and waste of power the leads may be connected to copper plates 104 interposed between the female base block and its backing plate and between the punch plate and the male base block. In addition, as noted earlier, the composite rule die stock may be electroplated with a metal or alloy of good electrical conductivity to present a low resistance path to the second (tipping) sections of the rule die and punches.

Now the quill is slowly lowered, preferably at a controlled rate under power with a predetermined gap space maintained between electrode and the punch plate. By so doing the female die rule electrode will electro-erode a kerf 106 (the punch electrode sections will electro-erode openings 22, 24, 26) through the punch plate to leave a formed punch 108 and scrap 110 and also to leave in said punch 108 openings that match the inset punches. The fully engaged position of the electrode assembly is indicated in FIG. 15. Next the electrode assembly is backed off as shown in FIG. 16 and the scrap removed. At this time the punch 108 is finished, requiring no dressing or trimming. If hardened punch plate stock is used no hardening is needed. Soft stock requires subsequent hardening of the punch. The requisite clearance will be present since, although by electro-erosion a clean vertical kerf is formed, the distance between the electrode and the edges of the kerf can be controlled with great accuracy from an almost zero clearance to a few thousandths of an inch by varying the voltage (e.g. the amplitude, waveform and frequency of pulsations) supplied from the power source. Accordingly the voltage will be regulated to yield the blanking and piercing clearance needed for the particular die set being made.

The die set thereupon is removed from the electro-erosion machine and its various components wiped clean. The punch plate scrap 110 is discarded. However the die set cannot yet be used for a metal working operation due to the presence of the electrode-functioning tips (second sections on the die rule sections and inset punches). These served an essential function in the forming of the male punch 108 to exactly (save for clearance) match the female rule die and inset punches; but they now are extraneous since the metal from which they are constituted is too soft for metal working and since during electro-erosion they became eroded. Accordingly, pursuant to the present invention, the tips now are removed. Any suitable method of removal can be employed. Thus if the rule die stock was used in straight sections cut from prehardened composite stock which did not have to be hardened and tempered after bending operations and if the bond was a soft solder, the removal of the tips can be accomplished simply by heating the female die, e.g. by induction heating, to a temperature sufficiently high to fuse the bond without affecting the hardness of the die rule stock.

Nevertheless, because the component to be formed ordinarily will require shaping of the composite die rule stock which has to be annealed for bending and subsequently rehardened so that soft solder preferably is not used for the bond, we usually remove the tips by a particulate metal removing operation, preferably grinding, milling, routing or planing. Such an operation is seen in FIG. 17. As there illustrated the die set has been opened to disengage the upper and lower shoes, and the upper shoe removed from the female backing plate 32. Said plate is inverted so that the second section 60 of the rule die and sections 68 of the punches are uppermost. The backing plate is secured in such position to the bed 112 of a surface grinding machine. The grinding wheel 114 is moved over the female rule die at a setting proper to abrade away the second sections and leave the working edge 58 of the first rule section and punches standing clear. If desired a flank of the first rule die section may be chamfered as at 114 to reduce the thickness of the working edge.

Conventional strippers, e.g. elastomeric pads 116, 118, are mounted on the female and male base blocks and the two parts of the die are reassembled so that the female and male sections are in proper mutual working association as shown in FIG. 18, the die set thereupon being ready for use.

We have up to this point described our invention in the simplest form as applied to composite die rule stock and composite inset punches which are designed to perform only blanking and piercing operations after having electroded the male punch stock properly for this purpose. However as noted earlier we also are able to electro-erode the male punch stock in a manner such that other operations, like forming, drawing and coining, can be effected. To this end we utilize composite die rule stock and composite inset punchers of more complex shapes.

As pointed out hereinabove the composite die rule stock used for blanking has a second (electrode) section which is of the same thickness and constitutes a regular, i.e. uniform, extension of the first (blanking) section; and the same is true of the composite inset punches used for piercing. This arrangement is altered for forming, drawing, and coining.

For instance in FIG. 9 we have shown in transverse cross-section a composite die rule stock 120 comprising a first section 122 and a second section 124 bonded to the working edge thereof in the manner detailed hereinabove. The first and second sections have the different physical and electrical characteristics heretofore described. The second section is thicker than the first and at 126 overhangs at least the inner edge 128 of the first section which in the finished die set will face the male punch when the male and female dies are telescoped. The outer edges of the two sections may be in alignment. Due to this arrangement the rule die made from the stock 120 will electro-erode a kerf in the male punch stock that is wider than the first section so that the finished die set will draw or form the edge of the component being made by said rule. The amount of overhang is regulatable, as by the provision of stock with different overhangs so that either drawing or forming will be accomplished and so that sheet metal of any thickness can be drawn or formed.

In FIG. 10 we have illustrated in transverse cross-section a composite die rule stock 130 comprising a first section 132 and a second section 134. This stock is used where it is desired to increase, by electro-erosion, the clearance or space between a female rule die and a previously made male punch, e.g. in order to enable the die set to work upon thicker sheet metal. Since the male punch already has been formed there is no need to electro-erode a kerf and, accordingly, the second section does not have to cover the working edge 136 of the first section. Instead the second section covers and is bonded in the manner described above to the inner edge 138 of the first section whereby during electro-erosion the electrode rule die will, in effect, trim, i.e. shave, the male punch.

It will be understood that after the female rule dies comprising the composite stocks 120, 130 have carried out the electro-erosion step, the second section is removed as by heating or machining.

FIGS. 11, 12 and 13 are axial sectional views through composite inset punches which will enable forming, drawing and coining operations to be effected. Thus, the inset punch 140 of FIG. 11 includes a first section 142 and a second (electrode) section 144 bonded to the working edge (face) of the first section. The second section is of the same cross-sectional shape as the first section but is larger so as to overhang the same and thereby electro-erode in the male punch and oversize opening of the proper cross-sectional dimensions to enable a forming or a drawing step to be achieved in cooperation with the first section after removal of the second section. It will be appreciated that if the radial clearance is equal to or greater than the thickness of the stock being worked a drawing or forming step will be performed, while if it is of lesser thickness it will be proper for extrusion work. The clearance actually provided can be regulated by varying the overhang.

It may be observed that we prefer to bond to one another the two sections of inset punches having non-matching cross-sections by the use of solder or the like that will fuse below hardening temperatures since the non-uniformity of the sections makes the removal of the second sections unnecessarily difficult by machining.

The inset punch 146 of FIG. 12 is used for coining matching protuberances on opposite faces of sheet metal. It includes a first section 148 and a second (electrode) section) 150. The working edge (face) of the first section includes a bore 152 of the same cross-sectional shape and size as the second section, the second section having an end received therein and bonded thereto. Thereby, after electro-erosion and removal of the second section, the inset punch will have a blind well that is registered with and matches a blind well in the male punch. The height of the inset punch is such that it slightly indents, but does not punch through the sheet metal being worked so that it will cold flow the sheet metal into both blind wells to raise registered protuberances on opposite surfaces thereof by coining.

The inset punch 154 of FIG. 13 is adapted to be used for piercing an opening and for center punching. Accordingly the first section 156 has a centered pointed boss 158 on the working edge. The second section 160 is bonded to the first section, being formed with an indentation to receive the boss. The second section matches the first in cross-section so that it will, before removal and used as an electrode during electro-erosion, form an opening in the male punch that matches the first section, plus the requisite clearance as determined by regulation of the electro-erosion step. The pointed boss is useful for marking work and to ease the punching of heavy sheet metal work.

It will be understood that through the employment of our invention we are able to use the blanking, coining, forming and/or piercing female rule die and insert punches as electrodes by the use of the electrode-tipped composite rule die stock and electrode-tipped punches so that it is not necessary to disassemble the electrode after the erosion step and so that no possibility of misalignment or mismatching of the male punch with female die and inset punches can take place. Nor is it necessary to spend many hours of valuable time in the hand finishing of the male punch. It also should be observed that the peripheral compression step and means are particularly useful in connection with the electro-erosion step since the ensuing rigidification holds the electrode assembly against vibrations and shifting of the rule die that otherwise might occur in wood.

It will thus be seen that there are provided a die set, rule stocks, insert punch stock and methods in which the several objects of this invention are achieved, and which are well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described our invention, we claim as new and desire to secure by Letters Patent:

1. A hybrid apparatus for making a punch of predetermined shape by electro-erosion which said apparatus is subsequently transformable into a rule die of a shape conforming to the shape of the punch, said apparatus comprising a base block, a rule die supported by said base block and projecting therefrom and defining a hollow electrode configuration conforming to the punch to be made, said rule die including a first section and a second section, said first section constituting a hardenable steel rule die having a portion contained within said base block for support thereby and another portion protruding from the base block for service as a rule die, the edge of said rule die remote from the base block being the working edge of said first section, means bonding said second section to the working edge of said first section, said second section being composed of material having good electro-erosion properties and being a material of good electrical conductivity selected from the class consisting of brass, copper, aluminum and silver, and means for supplying a pulsating D.C. potential to said rule die electrode, whereby when the rule die electrode is approached in a liquid dielectric medium to a punch plate having a pulsating D.C. potential of opposite polarity applied thereto the rule die electrode will by electro-erosion form a punch conforming to the shape of the rule die electrode and whereby the second section thereafter may be removed to leave a rule die that matches the shape of the thus formed punch.

2. An apparatus as set forth in claim 1 which further includes a hybrid inset punch-electrode supported by said base block and projecting therefrom within the hollow configuration of the rule die electrode, said punch-electrode including a first section and a second section, said first section constituting steel having a portion contained within the base block for support thereby and another portion protruding from the base block for service as a punch, said second section being composed of a metal of better electrical conductivity than the first section, means bonding the second section to the surface of the first section remote from the base plate, said inset punch-electrode being electrically connected to the rule die electrode whereby said inset punch-electrode will form an opening in the punch plate by electro-erosion as the punch is being formed from the punch plate and whereby the second section of the punch-electrode thereafter may be removed to leave a working punch that matches the shape of said opening.

3. An apparatus as set forth in claim 1 wherein the two sections are of like thicknesses.

4. An apparatus as set forth in claim 1 wherein the second section is thicker than the first and is bonded to the working edge of the first so as to overhang the surface of the first section defining a portion of the inner periphery of the hollow electrode configuration.

5. An apparatus as set forth in claim 1 wherein the second section is bonded to the surface of the first section defining a portion of the inner periphery of the hollow electrode configuration.

6. An apparatus as set forth in claim 2 wherein the second section of the inset punch-electrode is of the same cross sectional size and shape as the first section of the said inset punch-electrode.

7. An apparatus as set forth in claim 2 wherein the second section of the inset punch-electrode is of the same cross-sectional shape as and larger than the first section of the said inset punch-electrode.

8. An apparatus as set forth in claim 2 wherein the second section of the inset punch-electrode is of smaller cross-sectional size than the first section of the said inset punch-electrode.

9. A composite rule die electrode stock comprising a first rule die section of steel and a second section of a metal having good electro-erosion properties bonded to the first section.

10. A composite stock as set forth in claim 9 wherein a side of at least the first section is covered with a metal of good electro-conductivity.

11. A composite inset punch-electrode comprising a first section of steel having a working edge and a second section of a metal having good electro-erosion properties bonded to the working edge of the first section.

References Cited in the file of this patent

UNITED STATES PATENTS

| | | |
|---|---|---|
| 1,105,887 | Dake | Aug. 4, 1914 |
| 1,187,166 | Mott | June 13, 1916 |
| 1,300,068 | Weld | Apr. 8, 1919 |
| 1,715,972 | Woodward et al. | June 4, 1929 |
| 1,939,478 | Whistler | Dec. 12, 1933 |
| 2,138,388 | Platz | Mar. 29, 1938 |
| 2,765,394 | Griffith | Oct. 2, 1956 |
| 2,800,566 | Matulaitis | July 23, 1957 |
| 2,924,701 | Stamper | Feb. 1, 1960 |
| 2,927,190 | Dulebohn et al. | Mar. 1, 1960 |

FOREIGN PATENTS

| | | |
|---|---|---|
| 932,049 | France | Mar. 17, 1947 |
| 776,369 | Great Britain | June 5, 1957 |